Sept. 29, 1953 C. W. VOGT 2,653,430
METHOD OF AND APPARATUS FOR PRODUCING
PACKAGED UNITS OF COMMODITIES
Filed Jan. 15, 1949 6 Sheets-Sheet 1
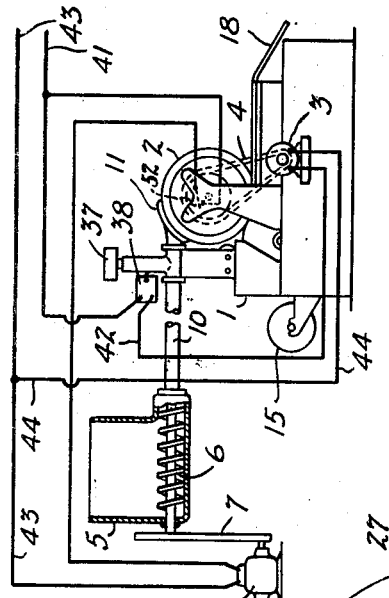
INVENTOR
CLARENCE W. VOGT
BY Hubert E. Evans
ATTORNEYS

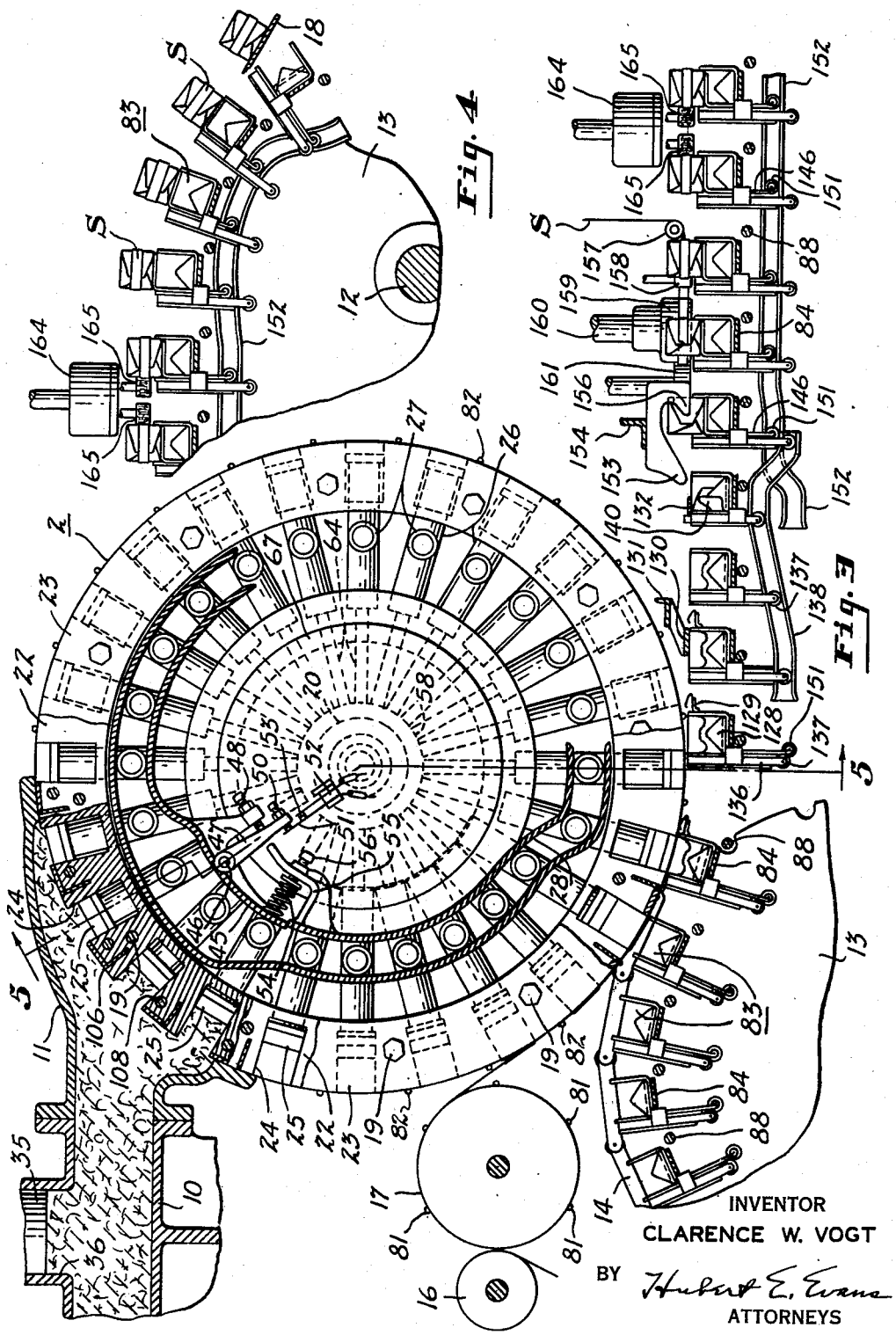

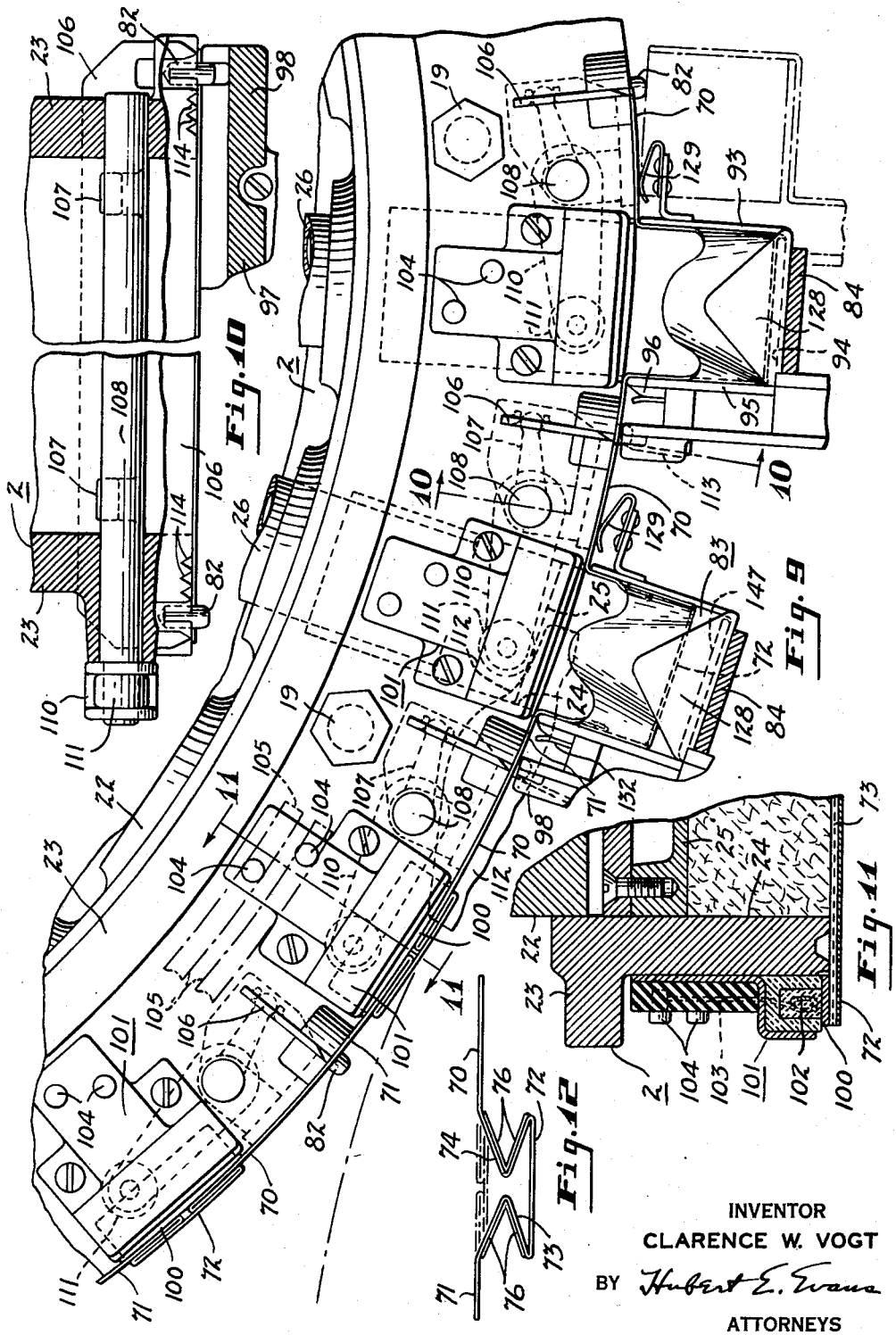

Sept. 29, 1953 C. W. VOGT 2,653,430
METHOD OF AND APPARATUS FOR PRODUCING
PACKAGED UNITS OF COMMODITIES
Filed Jan. 15, 1949 6 Sheets-Sheet 4

INVENTOR
CLARENCE W. VOGT
BY Hubert E. Evans
ATTORNEYS

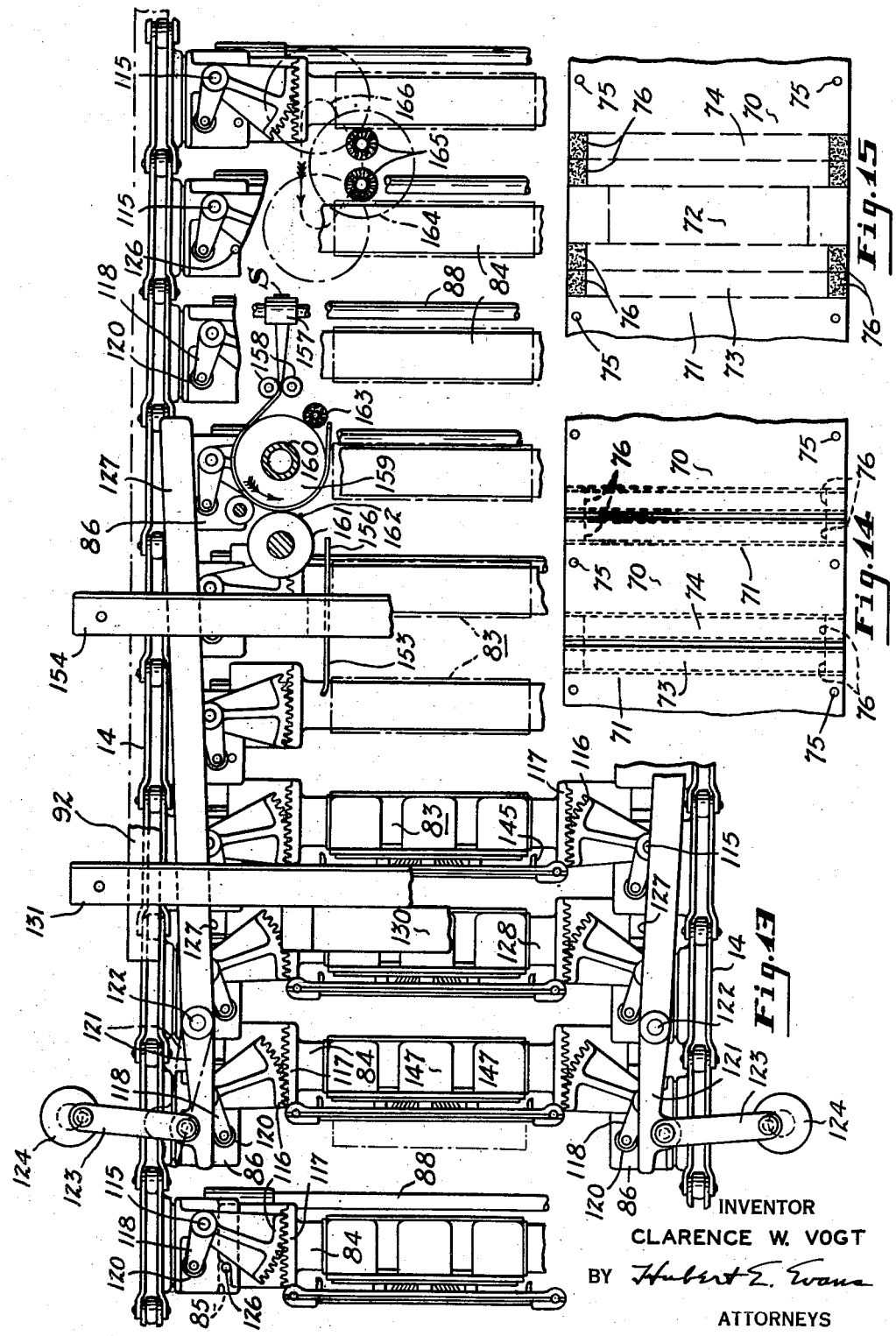

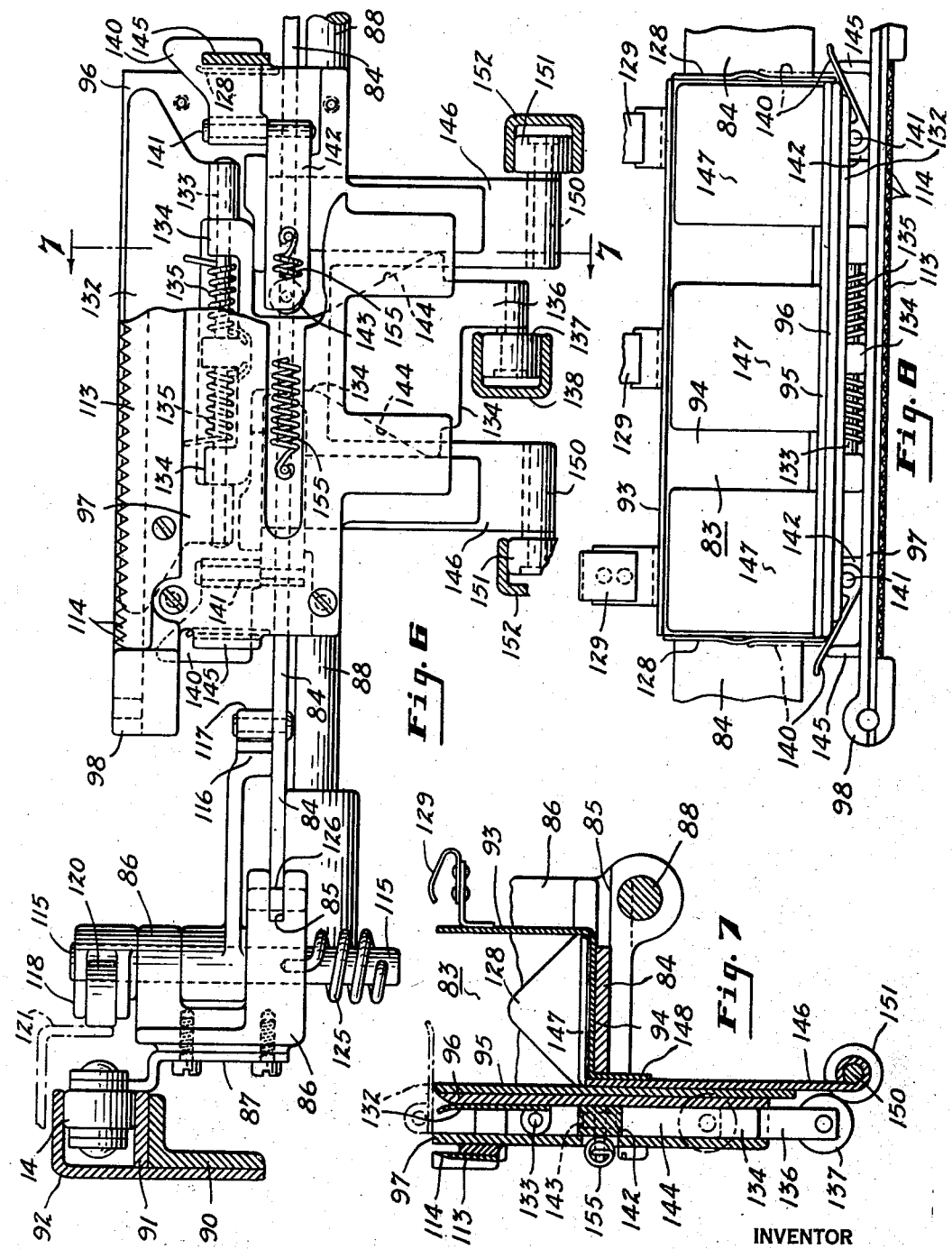

Patented Sept. 29, 1953

2,653,430

UNITED STATES PATENT OFFICE 2,653,430

METHOD OF AND APPARATUS FOR PRODUCING PACKAGED UNITS OF COMMODITIES

Clarence W. Vogt, Norwalk, Conn.

Application January 15, 1949, Serial No. 71,195

13 Claims. (Cl. 53—15)

This invention relates to producing and packaging commodities, and in particular to a method and apparatus for feeding predetermined quantities of a material to an enclosure or enwrapment. The invention is particularly adapted to the packaging of flowable or moldable materials such as, for example, butter, margarine, confections, ice creams, etc.

It is an object of the present invention to provide a method of and apparatus for packaging commodities which utilizes a continuous movement or flow so that packaging may be carried out in a smooth and rapid sequence of operations without stopping and starting of the apparatus during packaging. This permits the carrying out of the packaging at higher speeds and without the wear of parts occasioned by sudden stops and starts. Where the commodity to be packaged requires relatively accurate measurement of the quantity to be deposited in each enwrapment the continuous flow principle is especially desirable.

Another object is to provide a method of and apparatus for producing units of moldable or plastic material involving a series of molding units which move continuously in one direction in which the plastic material is cleanly severed from the molding unit by being accelerated with respect to the molding unit as soon as deposition from the molding unit has been completed.

A further object is to provide a method of and apparatus for packaging commodities utilizing a series of formed enwrapments to receive predetermined quantities of the commodity from a continuously moving series of commodity supporting elements which move from a source of supply and deposit the commodity into the enwrapments.

A further object is to provide a method of and apparatus for packaging commodities which involves the use of a series of commodity supporting elements moving in an endless path past a source of supply, a series of receptacles which move in a path, a portion of which adjoins a portion of the path of the commodity supporting elements with a series of formed enwrapments being fed between commodity supporting elements and the receptacles.

A further object is to provide a method of and apparatus for packaging plastic or moldable materials in which a series of molding units pass adjacent a plurality of sources of supply of plastic or moldable material so that the molding units may receive material from more than a single source of supply. This is of particular advantage in the making of a composite article such as, for example, a multi-layer ice cream confection.

A still further object is to provide a method of and apparatus for packaging commodities in which a series of formed enwrapments are fed adjacent a series of pockets or receptacles while a series of commodity supporting elements move adjacent the enwrapments and deposit a predetermined quantity of the commodity into the enwrapment as it is received in one of the pockets or receptacles. Since the enwrapment in its distended condition is adapted to closely fit the walls of a pocket or receptacle, uniformly shaped packages may be produced even though irregularly shaped articles are being packaged.

Other objects and advantages will become apparent from the following detailed description accompanied by the drawings in which:

Figure 1 is a diagrammatic elevational view of a form of apparatus embodying the present invention, illustrating the electrical connections and general arrangement of parts;

Fig. 2 is an enlarged elevational view of the apparatus;

Fig. 3 is a further enlarged sectional view with parts broken away of a portion of the apparatus illustrating details of operation thereof;

Fig. 4 is a fragmentary sectional view of the delivery end of the apparatus which comprises an extension of a portion of the apparatus shown in Fig. 3;

Fig. 6 is an enlarged fragmentary elevational view of one of the series of pockets or receptacles in which the commodity may be deposited for packaging;

Fig. 7 is a sectional view taken substantially on line 7—7 of Fig. 6;

Fig. 8 is an enlarged plan view of a portion of the receptacle or pocket shown in Figs. 6 and 7;

Fig. 9 is a magnified fragmentary sectional view through a portion of the apparatus to illustrate details of operation at approximately the time that the commodity is deposited into the enwrapment;

Fig. 10 is a fragmentary sectional view taken substantially on line 10—10 of Fig. 9;

Fig. 11 is another fragmentary sectional view taken substantially on line 11—11 of Fig. 9;

Fig. 12 is a diagrammatic view of a portion of a formed enwrapment which may be used in the present invention showing with full and dotted outline, two positions thereof;

Fig. 13 is a developed plan view of the series of pockets or receptacles from the deposition of the commodity to the completion of the packaging operation;

Fig. 14 is a top plan view of a portion of a series of enwrapments which may be used in accordance with the present invention; and Fig. 15 is a plan view looking at the underside of a web of wrapping material prior to the formation of the enwrapments shown in Fig. 14.

Figure 5:
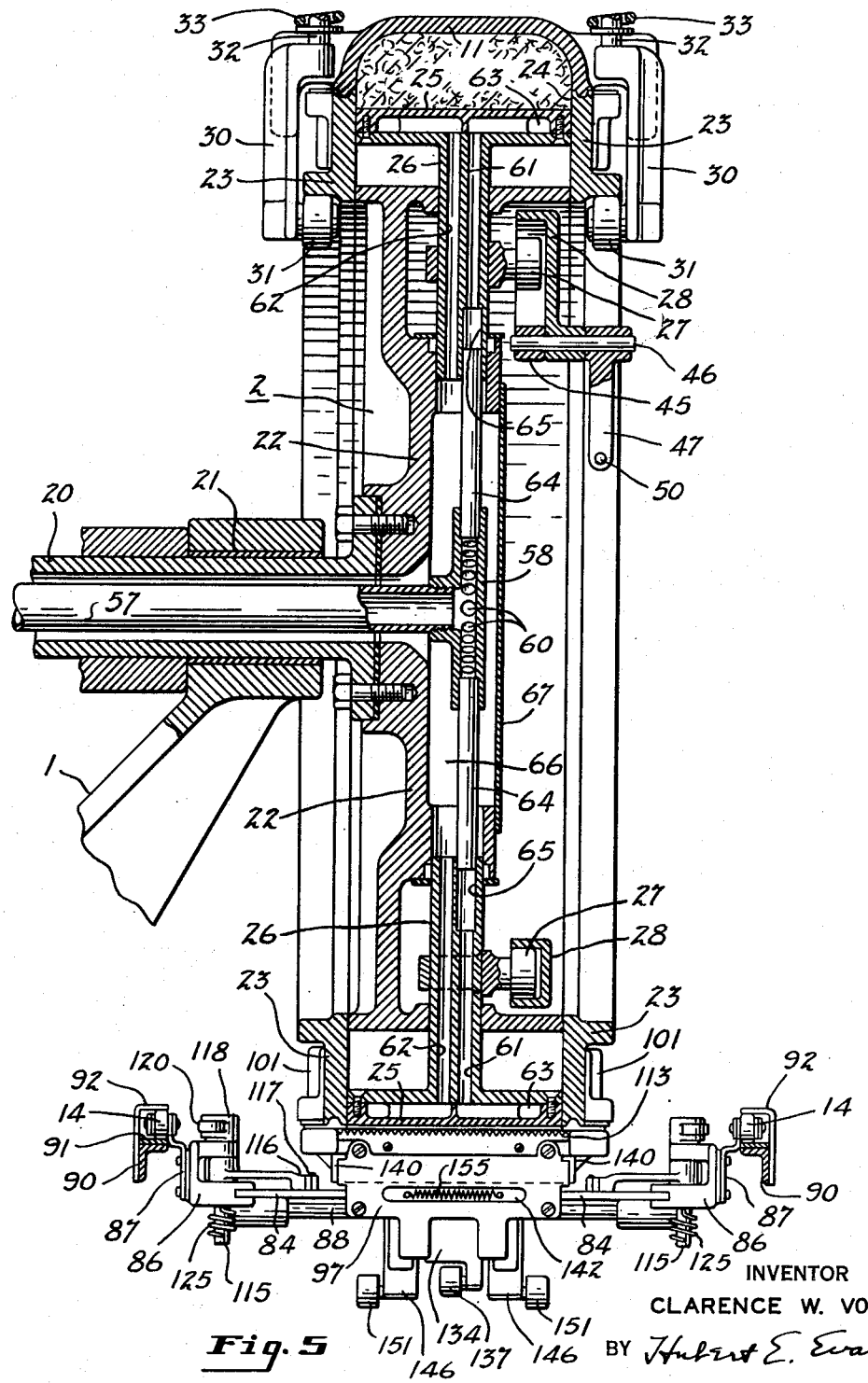
Fig. 5 is an enlarged sectional view taken substantially on line 5—5 of Fig. 3.

Briefly, the form of apparatus embodying the present invention illustrated in the drawings, comprises a series of commodity supporting elements or molding units which travel in an endless path in a single direction and a portion of the path of the receptacles adjoins or coincides with a portion of the path of the commodity supporting elements. The pockets or receptacles may be mounted between a pair of chains moving in an endless path around a pair of sprockets. A series or chain of formed or preformed enwrapments is fed between the commodity supporting elements and the pockets or receptacles. The commodity to be packaged travels from a suitable source of supply, is placed in the commodity supporting elements or molding units and is deposited into an enwrapment as the enwrapment is in alignment with one of the pockets or receptacles. The completion of the packaging may then be effected while the commodity and enwrapment are supported in the pocket or receptacle.

Looking at Figs. 1 and 2, the numeral 1 indicates a frame or support for the apparatus. A drum 2 may be mounted for rotation on a shaft supported by the frame and may be driven by a motor 3 which drives a belt or chain 4. The numeral 5 indicates a hopper in which may be disposed a supply of the commodity to be packaged. In the drawings the commodity to be packaged is illustrated as a moldable or plastic substance and thus it may be advanced from the hopper 5 to the drum 2 by a feed screw 6. The screw 6 is driven by a belt or chain 7 which is in turn activated by a motor 8. Rotation of the screw forces the plastic material through a supply line 10 to a manifold or header 11 which may be connected to the drum 2 in any suitable manner.

Disposed beneath the drum 2 is a pair of spaced shafts 12 each of which carries a pair of sprockets 13. Endless chains 14 are mounted on each of the sprockets 13 and the chains 14 carry between them the series of pockets or receptacles which will be described in detail later.

The enwrapments may be provided from a supply roll indicated by the numeral 15 in Fig. 2 and from this supply roll the enwrapments may be withdrawn as a web and fed between a pair of feed rolls 16 and 17. The feed rolls 16 and 17 are preferably driven from the shaft which carries the drum 2 so that the feed of the enwrapments is properly synchronized with the travel of the drum. After passing around a portion of the periphery of the feed roll 17 the enwrapments travel adjacent the drum and between the commodity supporting elements thereon and the pockets or receptacles carried by the chains 14. During this travel the commodity being packaged is deposited into the enwrapment which is in turn supported by the pocket or receptacle carried by the chains 14 and packaging operations are accomplished as the pockets move toward the right looking at Fig. 2. Completed packages are removed from the pockets or receptacles and move along a delivery chute 18.

*Drum and control system*

The drum 2 may best be seen in Fig. 3 and in cross section in Fig. 5. It is carried by a shaft 20 mounted in bearings 21 carried by the frame 1. The drum proper includes a rotary member 22 secured to the shaft 20. At its outer periphery the rotary member 22 carries a pair of spaced annular rings 23 which may be held to the rotary member 22 by bolts 19. The periphery of the rotary member 22 is provided with a plurality of axially extending recesses or pockets 24, the ends of which are defined by the rings 23. These pockets or recesses provide individual molding units suitable for supporting a predetermined quantity of the commodity to be packaged.

In the present form of the invention the recesses 24 are shown in the approximate shape and size of a quarter pound block of butter or margarine.

Also disposed within the pockets and closely fitting with the walls thereof are a plurality of pistons or plungers 25. These pistons are mounted on rods 26 which are slideably mounted in portions of the rotary member 22. The rods 26 carry roller cam followers 27 extending outwardly from one side thereof which followers engage and ride in a stationary cam track 28 which, as best shown in Fig. 2, is secured to armlike extensions of the frame 1. As the shaft 20 and the rotary member 22 of the drum rotate, the cam track 28 controls the location of the pistons 25 within the recesses 24 to admit or eject the commodity to be packaged.

The manifold or header 11 leading from the supply line 10 is secured to the spaced annular rings 23 of the drum to provide a closed, sealed chamber within which the commodity may flow under pressure into the recesses 24 of the drum. Figs. 2 and 5 best show this connection. A plurality of hanger or clamp members 30 are provided at one end with rollers 31 which engage the radially inward edges of the rings 23. The members 30 are received in recesses in the edges of the manifold 11 and are provided at their opposite ends with a stem 32 which passes through an aperture in the manifold and may be threaded to receive compression springs 33 and nuts 34. In this way the manifold 11 may be securely held to the periphery of the drum and resiliently sealed according to the pressure exerted between the manifold and the nuts 34 by the springs 33 even though the drum rotates with respect to the manifold.

Connected into the supply line 10 is a control device to facilitate the filling of the recesses 24 as the drum rotates past the header or manifold 11. The control includes a piston 35 which is mounted for reciprocation in a cylindrical passage 36 which opens off the supply line 10. The piston 35 is provided with one or more weights 37 so that it is pressed downwardly in the passage 36 with a predetermined force. A rheostat 38 is mounted adjacent the piston 35 and is activated by an oscillating lever 40 which is bifurcated at one end to receive a pin carried by the piston 35 (see Fig. 2). The rheostat 38 is connected at one of its contacts to one line 41 of a suitable source of current. The other contact of the rheostat 38 is connected by an electric circuit 42 with the motor 3 which drives the drum 2. The other line 43 of the source of current is connected to the motor 3 by a connecting circuit 44.

Thus, as the commodity flows through supply line 10 and is placed in the recesses 24 of the drum at the desired uniform rate, the position of the piston 35 does not vary. However, if the commodity is advanced through the supply line in greater volume than can be received by the recesses of the drum, the increased volume and pressure will raise the piston 35, pivoting the oscillating lever 40 in a counterclockwise direction looking at Fig. 2, increasing the speed of the motor 3 driving the drum. Conversely, if insufficient material to fill the recesses of the drum is being advanced through the supply line, the weight 37 will cause the piston 35 to move downwardly, pivoting the oscillating lever 40 in a clockwise direction looking at Fig. 2 which will serve to decrease the speed of the motor 3 and the drum 2.

Fig. 3 best illustrates the operation of the pistons 25 in the recesses 24 as the drum rotates past the manifold 11 and the plastic or moldable material is placed in the recesses 24. It will be noted that as the drum rotates, the cam track 28 which controls the radial position of the pistons by its action on the roller followers 27 widens out leaving the rollers and the pistons free to move when the pistons are opposite the open interior of the manifold 11. With the followers free to move, the pressure on the material within the supply line and within the manifold caused by the feeding action of the screw 6, acts to force the piston radially inwardly and cause a flow of the plastic or moldable material into one of the recesses 24. This action is limited by the inward margin of the cam track 22 which prevents the piston from withdrawing radially inwardly beyond the desired amount and thus controls the quantity of plastic or flowable material which may be placed within the recesses 24.

The radially inward edge of the cam track 22 has a section or gate 45 which is pivotally mounted about a pivot pin 46 and the pivot pin also has connected thereto a lever arm 47. The inward pivotal movement of the gate portion 45 of the cam track is controlled by a set screw 48 which acts as a stop for the lever arm 47 (see Fig. 3). Thus, if desired, the inward extent of the roller followers 27 and accordingly the volume of the filled recesses 24 may be adjusted by movement of the set screw 48. Such an adjustment may be desirable to compensate for changes in density of the plastic material which may occur due to separate processing of various amounts of the material. For example, it is difficult to precisely control the density of various runs of margarine or butter, yet it is necessary that the consumer be provided with full weight. Accordingly, the difference in density may be compensated for by adjusting the volume of the recesses 24.

The lever arm 47 is also provided with a set screw 50. This set screw when the gate is closed, is disposed closely adjacent a leaf spring member 51 of a switch 52, and if the gate is not closed to its position where the arm 47 abuts the set screw 48, the set screw 50 moves the leaf spring 51 and separates the contacts 53 of the switch. It may be noted from Fig. 1 that the switch 52 is connected in series between one line 41 of the suitable source of current and the motor 8 which activates the feed screw 6. Thus, if the set screw 50 separates contacts 53 the flow of current to operate the motor 8 is stopped and further feeding of the plastic substance by the feed screw ceases. This is a signal that the recess 24 whose cam follower 27 is passing over the gate 45 has not been filled to capacity with plastic material. Obviously the contacts 53 of the switch 52 may also be connected to activate other alarm or warning devices.

To urge the gate portion 45 and the oscillating lever 47 in a clockwise direction, looking at Fig. 3, and thus insure that each of the recesses 24 are filled, a compression spring 54 may be inserted between an extension 55 of the stationary portion of the cam track 28 and the gate portion 45 of the cam track. To adjust the compressive strength of the spring, an adjusting screw 56 may be threaded through the extension 55.

Where the apparatus is utilized for plastic or moldable materials, which are handled at cool or cold temperatures which tend to cling to the metal surfaces, it may be desirable to warm such surfaces. To accomplish this the drum, as may best be seen in Fig. 5, is provided with passages for a heat transfer medium. The drum shaft 20 may be hollow and have disposed therein a pipe or conduit 57 which connects with a distributing hub 58. This hub has a plurality of radially extending passages 60, each one of which is aligned with one of the rods 26 carrying the pistons 25. The rods 26 of the pistons are provided with inlet passages 61 and outlet passages 62 which lead to and from chambers 63 disposed within the hollow heads of the pistons 25. The inlet passages 61 of the rods 26 are connected to the radial passages 60 of the distributing hub 58 by connector tubes 64 which are secured to the hub 58 in alignment with passages 60. The outer end portions of the connector tubes 64 are received in enlarged portions 65 of the inlet passages 61 so that the connector tubes 64 may slide in such enlarged portions 65 as the pistons move radially inwardly and outwardly to fill and discharge the recesses 24.

From the connector tubes 64 the heat transfer fluid flows through the inlet passages 61 and by appropriate baffling within the chambers 63 of the heads of the pistons 25, is required to follow a devious course through the chambers 63. From the chambers 63 the heat transfer fluid flows to the outlet passages 62 of the piston rods 26 and thence to an open portion 66 which is defined by the rotary member 22 of the drum, and a cover plate 67 which may be secured to the member 22. From the open central chamber 66 of the rotary member 22, the fluid may flow through the hollow drum shaft 20 between the interior of the shaft 20 and the exterior of the inlet conduit 57 within the shaft 20.

In the case of margarine or butter, a suitable heat transfer fluid is warm water to warm the heads of the pistons and minimize adhesion of margarine or butter thereto. Obviously, the heat transfer fluid should not be at a high enough temperature to adversely affect the product. However, in the case of handling other plastic or moldable materials, it may be desirable that the heat transfer fluid be cool or cold so that the surfaces of the piston may be chilled. It is also contemplated that it may not be necessary to flow a heat transfer medium through the above described passages. Further, if heat transfer is desired it may be accomplished by removing the cover plate 67 and blowing warm or chilled air through the piston rods and piston heads.

*Feeding enwrapments*

Many suitable enwrapments may be utilized in carrying out the present invention. For purposes of illustration I have selected a formed or preformed gusseted or pleated enwrapment such as is shown and described in my copending application filed October 28, 1948, Serial No. 56,942, and entitled Wrappers. The particular form of chained enwrapment shown in the present application is that disclosed in Figs. 4 and 5 of said copending application.

Such enwrapments comprise a series of individual enclosures for the unit to be packaged, the individual enwrapments being connected or chained together to facilitate advancement. An individual enwrapment is shown in Fig. 12. The numeral 70 indicates the leading flap of the wrapper while the numeral 71 indicates the trailing flap. The panel indicated by the numeral 72 will become the cover for the bottom face of the object to be wrapped and this panel is collapsed against the plane of the leading and trailing flaps by gussets or infolds indicated by numerals 73 and 74 respectively. These gusseted portions 73 and 74, when the enwrapment is distended from its dotted line position in Fig. 12, in the direction indicated by the full line position of the enwrapment in Fig. 12, will become the enclosures for the rear and front sides respectively of the article to be wrapped.

Fig. 14 shows a fragment of a chain of enwrapments ready for use and it may be seen that the connection between individual enwrapments is complete and integral across the web. The connection between adjacent enwrapments may be provided with perforations or other registry indicia indicated by the numeral 75. Separation of the individual enwrapments may be accomplished by severing the web on a line passing therethrough in the region of two of the aligned perforations 75. If desired the connection between adjacent enwrapments may be weakened to form a tear line or may be partially severed to facilitate separation.

Fig. 15 illustrates a portion of the chain of enwrapments looking at the underside of the web prior to the formation of the pleats, with the fold lines for the pleats indicated with broken lines. Preferably the underside of the edge portions of the enwrapment along the pleated portions 73 and 74 are provided with areas of a suitable adhesive material indicated by the numeral 76 so that the gussets or walls of the pleated portions may be adhered together to secure the bottom panel 72 adjacent the plane of the leading and trailing flaps, as clearly indicated in the dotted line position of Fig. 12. Any suitable adhesive material may be used for this purpose but it is believed preferable to utilize a thermoplastic adhesive so that when it is desired to drop the bottom panel 72, heat may be applied to the adhesive areas 76 to activate or soften the adhesive to tacky condition and separation or peeling of the gusset walls may be readily accomplished.

The chained enwrapments may be supplied in the form of a supply roll indicated by the numeral 15 in Figs. 1 and 2. The web of chained enwrapments may be advanced between feed rolls 16 and 17 which are preferably driven in synchronization with the drum to facilitate accurate registry of the individual enwrapments with respect to the recesses 24. The feed roll 17 as shown in Fig. 3 may be provided with projections or pins 81 which register with the perforations 75 along the edge portions of the enwrapment to maintain it in alignment and accurately feed the web of formed enwrapments. After passing over a portion of the periphery of the feed roll 17, the chained enwrapments travel adjacent the drum where they may be held in alignment by a plurality of pins 82 which extend from the drum and are received in the perforations 75 acting to align the enwrapments with respect to the drum. (See Fig. 9).

*Deposition of plastic material*

Carried between the spaced chains 14 and disposed beneath the drum 2 is an endless series of pockets or receptacles 83 which receive the distended enwrapments and the plastic substance as it is deposited by the pistons from the recesses 24. These pockets may be formed of sheet metal and secured to transverse supporting strips 84 which are carried in grooves 85 of bracket members 86 secured to links 87 which depend from the chains 14 (see Fig. 6). The brackets 86 also carry transverse stiffening and reinforcing rods 88 which act to maintain transverse alignment of the individual links and pockets. During a portion of the travel of the chains 14 it may be desirable to support the chains to insure that they travel in the desired path. Thus, as shown in Figs. 5 and 6, angle members 90 with friction resistant plates 91 may be supported in any suitable manner (not shown) from the frame to support and guide the chain. Where the pockets and chain are subjected to upwardly directed forces it may be desirable to provide a closed track thereto for the chains to travel. Fig. 6 shows the use of cover plates 92 carried by the angle members 90 to prevent the chains from raising.

As stated each of the series of pockets or receptacles 83 are supported and carried by the transverse supporting strips 84. The pockets themselves may comprise a sheet metal member forming a front wall 93 and a bottom wall 94 (see particularly Fig. 7). The rear wall of the pocket is defined by a plate 95 to which is affixed a second plate 96. Spaced from the plate 95 and the plate 96, and secured thereto, is a cover plate member 97. The cover plate is spaced from the plate 96 to permit interposition of moving parts which will be later described. Near the top of the cover plate and at each end thereof, recessed bosses 98 are mounted, these recesses being adapted to receive the pins 82 which project from the drum 2. Thus, as the pockets approach the periphery of the drum, the pins 82, which as previously described have passed through the perforations 75 along the edge portions of the enwrapments, are received in the recessed bosses 98 and each of the enwrapments and pockets or receptacles 83 are held in accurate alignment with the mouth of the recesses 24 of the drum.

As shown in the lower portion of Fig. 3, as the recesses 24 of the drum, rotating in a counter-clockwise direction, approach their lowermost position, the cam track 28 moves the cam followers 27 radially outwardly, pressing the pistons 25 radially outwardly to begin deposition of the plastic material from the recesses 24. At this point in the operating cycle, it is necessary that the bottom panel 72 of the enwrapment be released so that the gusset walls 73 and 74 may be distended to a position where they line the walls of the pockets 83 to receive the plastic material deposited from the recesses 24 of the drum. To release these gusset walls 73 and 74 which may be adhered to each other by a thermoplastic adhesive 76, heater shoes 100 are provided adjacent the periphery of the exterior rings 23 of the drum to contact the enwrapment and transfer heat to the adhesive areas 76.

The heater shoes 100 are best seen in Figs. 9 and 11 and comprise metal strips carried by heater blocks 101 secured to the exterior surface of the rings 23. It is believed preferable to utilize resistance heater elements 102 inserted in the heater blocks 101 and connected by wires 103 to a pair of contacts 104. Electricity to activate the heater elements 102 may be connected to the contacts 104 by a pair of stationary slip rings, the outline of which is indicated in Fig. 9 by dot and dash lines bearing numeral 105. These rings may be supported adjacent the drum in any suitable manner from the frame of the apparatus. The rings 105 are of sufficient peripheral extent to permit heating of the elements 102 so that the adhesive holding the gusset walls of the wrapper will be activated to tacky condition. Thus, as deposition of the plastic material begins, the plastic will distend the enwrapment into the pockets or receptacles 83.

As deposition commences, it is also necessary to sever the individual enwrapments from the chain in which they are fed. To accomplish this the drawings illustrate a shear blade 106 which slides in a radial direction in a recess in the periphery of the drum between adjacent recesses 24. The shear blade is carried by oscillating arms 107 which arms are mounted on a rocker shaft 108 journaled in the ring members 23 of the drum (see Figs. 9 and 10). The rocker shaft 108 is activated by a lever arm 110 which carries at its free end, a roller follower 111. As the roller follower approaches the position where it is desired to sever the enwrapments from the chain, it contacts a cam 112 which may be supported from the frame of the apparatus and may be seen in Fig. 9. The cam 112 raises the follower 111, oscillating the shaft 108, and causes the shear blade 106 to project from its slot in the drum and engage the connecting line between adjacent enwrapments. The cover plate 97 of the pocket or receptacle is provided with a cooperating shear blade 113. Shear blade 113 is spaced from the cover plate a space sufficient to receive the shear blade 106 projecting from the drum and the enwrapment is sheared by the cooperative action of these blades. If desired, the shear blades may be provided with serrations or teeth 114 to facilitate the cutting action. Preferably, the serrations or teeth are disposed on the shear blade 113 while the shear blade 97 carried by the drum has a relatively thickened cutting edge at least in the central portions thereof. The reason for this is to prevent the entrance of the plastic substance into the recess in which the shear blade 97 is disposed as the drum rotates past the header or manifold 11.

*Wiping action*

As may be seen in Fig. 3, when the recesses 24 of the drum approach a vertical position at the bottom of the drum the pistons 25 have been moved to their outward radial position and deposition of the contents of the recesses 24 is completed. In the case of plastic or moldable materials, it is desirable to wipe the face of the piston to prevent plastic material from clinging thereto, which clinging action may appreciably alter the quantity of material deposited. This feature is believed essential in the case of margarine or butter where Governmental authority requires full measure for the packages and it is to the interest of the producer not to package an excess of the commodity merely to insure avoiding the possibility of producing a package having less than the minimum. To accomplish this object, the present apparatus is constructed so that as deposition of the plastic material is completed the plastic material may be accelerated with respect to the recess 24 and the piston 25 and a wiping action is achieved.

It may be noted in Fig. 9 that the trailing flap 71 of the enwrapment extends over the top of the plate 95 which defines the rear wall of the pocket, and during acceleration of the plastic substance the face of the piston is wiped by this trailing flap, 71. The cleaning of the piston face is facilitated by the fact that the cohesion of the particles of the plastic material is generally greater than the adhesion of the plastic material to the face of the piston.

To accomplish this acceleration of the plastic material which is already continuously moving, the pockets or receptacles 83 are mounted so that they may move forward with respect to the conveyor chains 14. Figs. 6 and 13 best illustrate the mechanism for accomplishing the desired result. The bracket members 86 are provided with pivot pins 115. A segmental gear 116 is secured for movement with the pivot pin 115 and extends inwardly toward the pockets 83. The supporting bar 84, which carries the pocket, has secured thereto a rack member 117 in position to mesh with the segmental gear 116. As previously described, the ends of the bar 84 slide in grooves 85 in the brackets 86 and thus rotation of the pivot pins in counterclockwise direction looking at the top of Fig. 13 will advance the bar 84 with respect to the brackets 86. The oscillating movement of the pivot pins 115 may be obtained by mounting lever arms 118 thereon. These lever arms are secured to the pivot pins and carry at their free ends rollers 120. At each side of the machine, oscillating cam members 121 may be mounted on pivots 122. These cam members may be actuated by links 123 connected at one end to the cam members 121 and at their other ends to a pair of eccentrics 124 which may be driven in any suitable manner (not shown).

As the pockets move toward the right, viewing Fig. 13, the rollers 120 contact the oscillating cam members 121 which under the action of the eccentrics 124 move inwardly. The rollers 120 and lever arms 128 oscillate the pivot pins 115 and the segmental gears 116, causing the bar 84 to slide in the grooves 85 of the brackets 86, and accelerate the pocket 83 with respect to a succeeding pocket. In a relatively short forward motion of the conveyor chains 14, one of the pockets may be caused to advance for the full width of the plastic material to effect a complete wipe of the plastic material from the face of the piston 25. It may be that in many cases a complete wipe may not be necessary to adequately clean the face of the pistons.

To hold the pockets 83 in their normal or rearward position, a torsion spring 125 encircles the pivot pin (see Fig. 6) having one end secured to the bracket 86 and its other end secured to the pivot pin 115. This tends to urge the bar 84 along the grooves 85 so that the bar is in its rearward position and the oscillating cam members 121 accelerate the bar 84 to a forward position against the pressure of the spring 125. To limit the rearward movement of the bar 84 with respect to the brackets 86, a stop pin 126 may be inserted in the brackets 86 extending across the grooves 85 at the desired point. The stop pin 126 may best be seen in Figs. 6 and 13.

After the oscillating cam members 121 accelerate the pockets to their forward position as illustrated by a comparison of the dotted and full lines in Fig. 13, and as may be more clearly seen by the full and dotted lines in Fig. 9, stationary cam tracks 127 which comprise a continuation of the oscillating cam members 121 may be provided at each side of the apparatus to gradually, by their action on the rollers 120, permit a return of the pockets to their rearward position.

*Completing the package*

The sequence of operations for accomplishing the deposition of the plastic material in the enwrapment and distending the enwrapment as it is received in the pocket or receptacle have been described. In this position the enwrapment acts as a liner for the pocket and encloses the plastic material along its front, bottom and rear side faces.

Projecting from the end portions of the bottom pocket wall 94, are a pair of stationary, generally triangularly shaped bottom end folders 128. These folders 128 form the bottom end folds for the completed package, folding the marginal portions of the enwrapment upwardly against the lower portion of the ends of the block of plastic material as it is being placed into the pocket.

The next folding operation occurs after the pockets have been accelerated to wipe the face of the pistons. At this position as may be noted in Fig. 3, the curvature of the drum and the fact that the chains move outwardly on a line tangent to the under surface of the drum, causes a separation of the drum and the pockets. The forward wall 93 of each of the pockets may be provided with a plurality of finger members 129 to support the leading flap 70 of the enwrapment and maintain it at a point even with or above the top of the pocket. Then, as the pockets move along their path the leading flaps 70 of the enwrapments are successively engaged by a folding member 130 which comprises a stationary strip supported from transverse brackets 131 carried by the frame of the apparatus. The folder 130 smooths the leading flaps 70 across the tops of the blocks of plastic material as each pocket passes thereunder.

The next operation involves a folding forward of the trailing flap 71 to a position on top of the block of plastic material and preferably overlapping with the folded leading flap. The mechanism for accomplishing this comprises a folding member 132 pivotally mounted on a pin 133 carried by a slide member 134. The slide member 134 is disposed in the space between the wear plate 96 and the cover plate 97 which are mounted in spaced relation on the rear of each of the pockets. A pair of torsion springs 135 encircle each of the pins 133 with one free end of each torsion spring 135 bearing against the folder member 132 and the other free end thereof bearing against a portion of the slide member 134 (see Fig. 6) the slide member 134 carries a downwardly extending portion or leg 136 to which is mounted a roller follower 137. A stationary cam track 138 is mounted beneath the pockets and is adapted to receive the rollers 137 as the pockets advance from under the drum. The cam track 138 angles upwardly raising each of the followers 137 and their associated slide members 134 thus elevating the folders 132. As each of the folders 132 is raised, the torsion springs 135 cause it to rotate about the pin 133 from its full line position, shown in Fig. 7, to its dotted outline position in Fig. 7. Preferably the plate 96 is rounded along its top edge as is the plate 95 which forms the rear wall of the pocket to provide a cam surface so that the pivotal movement of the folder 132 is gradual and acts to fold the trailing flap 71 of the enwrapment onto the top of the plastic material.

Rear end folders 140 are also carried within the space between the plate 95 and the cover plate 97 on each of the pockets. These folders may be pivotally mounted on pins 141 which pins are carried by horizontally movable slide members 142. At their inner ends the slide members 142 carry rollers 143 which engage with wedge surfaces 144 of the slide member 134, as the slide member is raised by the cam track 138. The wedge surfaces 144 cause the slide members 142 to move outwardly and during this outward movement the folders 140 are guided so as to cause them to pivot about the pins 141, against the ends of the package and make the rear end folds. The guiding of the folders is provided by the end portions of the plate 96 and flange members 145 extending from the cover plate 97. Fig. 8 shows the normal position of the folders 140 in full lines and their final position with the end folds in place in dotted outline position. It may be noted from Fig. 6 that the slide member 134 moves upwardly sufficiently to cause the folder 132 to contact the trailing flap 71 of the enwrapment and raise it to vertical position before the wedge surfaces 144 commence their engagement with the rollers 143. The trailing flap 71 of the enwrapment is raised to vertical position prior to the formation of the rear end folds in order that the folds may be easily formed and will lie flat to provide a neat package.

Only the top end folds and front end folds need be made to complete the packaging of the blocks of plastic material. However, the packages must also be removed from the pockets 83. To accomplish this ejection or removal, a member 146 is provided with three flange portions 147 which are disposed at the bottom of each of the pockets and are supported on the bottom wall 94. The members 146 are adapted to slide vertically to raise the flanges 147 and eject the wrapped packages. The sliding of each of the members 146 is facilitated and guided by engagement with the plate 95, forming the rear wall of the pocket, and a downturned flange portion 148 carried by the bottom wall 94 of the pocket (see Fig. 7). The bottom portions of the member 146 carry pins 150 on which are mounted rollers 151. The rollers 151 engage a pair of stationary cam tracks 152, supported from the frame beneath the pockets 83 at each side of the cam track 138. As the pockets advance, the rollers 151 engage the cam tracks 152 and as may be seen in Fig. 3 the cam tracks lead upwardly to raise the ejector member 146 shortly after the rear end folds are completed. This raises the partially packaged plastic material and in this partially raised position the top end flaps of the package contact stationary folder members 153 which depend from a transverse support member 154 carried by the frame of the apparatus.

As soon as the top end folders 153 contact the package the rear end folders 140 and the trailing flap folder 132 may return to their normal positions. This may be done by causing the cam track 138 to veer downwardly, lowering the slide member 134 and pulling the rear flap folder 132 back to its full line position shown in Fig. 7. As the wedge surfaces 144 on the slide member 134 leave the rollers 143 of the horizontal slide members 142, a coil spring 155 connected between the slide members 142 causes them to return to their normal position drawing the rear end folders 140 back into their full line position shown in Fig. 8.

Further movement of the package causes the top end folders 153 to fold down the top end flaps of the package. The transverse support member 154 also has depending therefrom folder members 156 which contact the front end flaps of the package and fold them against the ends of the package.

In this position the folds of the package have been completed and it is then only necessary to further raise the ejector member 146 with its three flange portions 147 by an upward angling of the cam tracks 152 to cause the wrapped packages to be ejected from the pockets or receptacles 83.

The drawings illustrate another additional step before ejection of the packages, namely, the application of a sealing strip to each end of the packages. The purpose of the sealing strip is to securely hold the end folds in place. Figs. 3 and 13 show the sequence of operations necessary for applying one of the sealing strips. The strip indicated by S may be fed from a supply roll (not shown) and will be advanced downwardly from above the conveyor carrying the pockets 83, passing under a guide roll, or idler 157. From the guide roll 157, the strip S may then be turned so that it is in a vertical plane and may be fed through a pair of driven feed rollers 158. The strip next passes around the periphery of a drum 159, rotated from a driven vertical shaft 160.

The drum 159 may be provided with heater elements (not shown) to activate a suitable thermoplastic adhesive applied to the surface of the strip S. Adjacent the drum 159 a roller 161 may be provided which is provided on its peripheral surface with a cutter or knife 162 to sever a length of the strip upon each revolution of the roller 161. One of the drums 159 is disposed adjacent each end of each of the packages so that a pair of cut lengths of the strips S are applied directly to the folded end portions of the enwrapment.

As may be seen in Fig. 3, the packages have been partially ejected from the pockets 83 so that the strips S may be applied to the mid portion of the package, measured in a vertical direction. The lengths of strips S cut by the knives 162 may extend beyond the end portions of the package. In this way these free end portions may be folded around onto the sides of the package to insure that the end folds are securely held. The numeral 163 in Fig. 13 indicates one of the rotary brushes, or other members which may be mounted adjacent each of the drums 159, to prevent the leading edges of the cut lengths of strip from clinging to the drums 159 as they rotate past the ends of the package.

To fold the ends of the cut length of strip around onto the sides of the package a driven head or member 164 is disposed at a point just above the level of the package and at each end thereof. From this member 164 a pair of rotary brush members 165 extend downwardly into contact with the packages. The brush members 165 rotate with respect to the heads 164 and in addition the heads may be driven in orbital paths indicated by numeral 166 in Figure 13.

As the heads 164 move inwardly between a pair of adjacent packages, two of the rotary brush members 165 apply the trailing ends of the cut lengths of strips S secured to the ends of the preceding package to the sides of such package. Simultaneously the other two brush members 165 are applying the leading ends of the cut lengths of the strips S secured to the ends of the succeeding package to the sides of such package.

Following the application of the sealing strips or tapes S, the stationary cam track 152 again moves upwardly as shown in Fig. 4 to completely eject the packages from the pockets or receptacles 83, at which time the packages are received on and supported by the delivery chute 18. The packages may slide by gravity on the chute 18 or may be transferred to a conveyor for delivery to a place where they may be stored or further handled. The packages may be transferred to a conveyor which will group the packages in units so that they may be collectively placed in a carton or frame. In the case of margarine or butter, for example, four one-quarter pound packages may be assembled and placed in a carton to make a one pound package.

It will be understood that many alternatives in carrying out the present invention are possible. The drawings merely illustrate one preferred way of attaining the desired objectives. For example, the enwrapments shown and described comprise formed or pleated wrappers in which the bottom panel for the package is distended by the action of the plastic material on the infolds. In some instances it may be preferable to invert the form of enwrapment shown in Fig. 12 so that the commodity being packaged will first engage the panel 72 and will push it through the plane formed by the leading and trailing flaps of the wrapper. Also, the method of chaining the enwrapments may be modified. The above referred to copending application, Serial No. 56,942, filed October 28, 1948, discloses a similar enwrapment connected into a chain by providing a strip of adhesive material along the edge of the leading or trailing flap, or both, and overlapping the leading and trailing edge with portions of the adjacent wrappers as illustrated in Figs. 1 and 2 of said application. In this case, the severing mechanism (shown as shear blades 106 and 113 in Figs. 10 and 7) may be replaced by a heater to activate the adhesive used to chain the enwrapments and permit them to be peeled or slipped apart.

It is also contemplated that the plastic material may be deposited from the mold units into a tubular enwrapment or a bag or envelope. If desired, the molding unit may be cylindrical in cross section and after the material has been deposited in the enwrapment suitable forming members may act upon the package to give it a square or rectangular cross section to conform to packages produced by the apparatus illustrated in the present drawings. The molding and deposition of a cylindrical unit of plastic material is considered to be extremely desirable since a circle is known to enclose a larger area with a smaller perimeter than any other geometric shape. In addition, the use of a tubular enwrapment simplifies the folding operations of the package.

In connection with the formed or pleated enwrapments illustrated in the present application, it may be desirable that the bottom and/or side wall portions of the pockets or receptacles 83 be provided with connections to a suitable vacuum mechanism so that the enwrapment may be drawn downwardly into the pockets or receptacles prior to, or simultaneously with deposition of the product. In the case of a deformable commodity it may be desirable to draw the enwrapment downwardly and thus line the pockets in advance so that the resistance of the wrapper to distention will not damage the commodity being packaged.

It is also contemplated that commodities may be packaged by successively placing the material to be packaged in a series of molding units, each of which comprise a tubular member with a cylindrical bore having a cylindrical piston mounted therein for reciprocation. The tubular members and pistons may be mounted for axial movement parallel to the axis of a rotary member or drum. As the drum rotates the commodity to be packaged may be successively placed within the tubular members from one or more manifolds or headers by withdrawing the pistons in a manner similar to that shown in the drawings. When each of the tubular members has been filled with the desired amount of material they may be moved to a position where suitable enwrapments may be successively disposed around the tubular members. By withdrawing the tubular members while holding the pistons stationary, the measured amount of the commodity will be deposited within the tubular enwrapments. The packaging may be completed and, in the case of a plastic or moldable substance, suitable dies may form the packages during or after the completion of the packaging. As previously stated, squaring dies may be desirable to form unit packages of butter or margarine to a square or rectangular cross sectional shape.

In the form of the invention shown in the drawings it may also be desirable to provide an adjustment for the distance between the roller followers 27 and the top face of the pistons 25. For example, the roller followers 27 may be connected to the piston rods 26 with the use of eccentric bushings so that the dimension between the roller followers and the piston head may be slightly varied. This adjustment is believed desirable to insure that all of the molding units will receive from the source of supply a uniform amount of the commodity to be packaged and thus facilitate the production of packages containing an accurately measured amount of the commodity.

In the case of certain commodities it may be desirable to provide more than a single source of supply from which the molding units may receive amounts of the commodity being packaged. For example, in the confection field it is often desirable to produce a composite article. In the form of the invention illustrated in the drawings, this may be readily accomplished by providing a plurality of manifolds, or headers, and forming the cam track 22 so that the pistons 25 are withdrawn a predetermined amount as the recesses 24 pass in alignment with the various manifolds, or headers. The initial placement into the recess might be a wafer or cookie, followed by placement of a plurality of layers of the same, or different color, or flavor of ice cream, the molding unit being filled by placement of an additional wafer or cookie. Such a composite article could then be deposited into an enwrapment and packaging completed. It also appears that it may be desirable to subdivide the molding units in a direction parallel with the axis of the drum 2 so that the molding units are partitioned into a plurality of longitudinal pockets. A similar partitioning in the manifolds would permit the simultaneous placement in the recesses of a plurality of colors or flavors of the commodity to be packaged.

It may thus be seen that the present invention provides a superior method and apparatus for producing packaged commodites in a plurality of individual units. The use of continuously moving molding units in an endless path is believed to be especially beneficial to accomplish high productivity and smooth operation of the apparatus. Present commercial forms of apparatus for accomplishing similar results generally utilize one or a pair of molding units which receive the commodity to be packaged and move to discharge position where deposition occurs. The productivity of the machine is appreciably reduced due to the fact that no production is occurring while the molding units are returned from their discharge position to their loading position. In the present invention deposition is continuously occurring from some of the molding units while others are being fed to a loading position where they may receive the commodity to be packaged. In this way, high production may be obtained without increased speeds and the efficiency of the operation is greatly enhanced.

It will be understood that the foregoing description of preferred embodiments of the invention is for the purpose of explanation and illustration and numerous variations and modifications other than those which have been described may be made without departing from the spirit of the invention.

What I claim is:

1. The method of producing packages of plastic material which comprises continuously advancing a series of molding units, depositing plastic material in said molding units while they are advancing, advancing a series of formed enwrapments adjacent a portion of the path of said molding units, depositing plastic material from said molding units into said enwrapment, and accelerating said enwrapments and plastic material with respect to said molding units as the completion of said deposition to cause portions of said enwrapments to wipe portions of said molding units and remove plastic material tending to adhere thereto.

2. In the method of packaging plastic material the steps which comprise advancing a series of molding units containing plastic material, advancing a series of enwrapments adjacent said molding units and in synchronization therewith, depositing said plastic substance from said molding units into said enwrapments while the same are advancing in synchronization, and accelerating said enwrapments and plastic material with respect to said molding units at the completion of said deposition to cause portions of said enwrapments to wipe portions of said molding units and remove plastic material tending to adhere thereto.

3. Apparatus for producing packaged units of a moldable material which comprises a series of molding units continuously movable in a closed path adjacent a source of supply of said material, means for placing a predetermined quantity of said material into each of said molding units as they move past said source of supply, feed mechanism for continuously advancing a series of enwrapments adjacent said molding units, mechanism for successively depositing predetermined quantities of said material into said enwrapments, and means for accelerating said enwrapments and said material with respect to said molding units as deposition is completed to cause portions of said enwrapments to wipe portions of said molding units and remove plastic material tending to adhere thereto.

4. Apparatus for producing packaged units of a moldable material which comprises a series of molding units continuously movable in a closed path adjacent a source of supply of said material, means for placing a predetermined quantity of said material into each of said molding units as they move past said source of supply, feed mechanism for continuously advancing a series of enwrapments adjacent said molding units, a series of receptacles continuously movable in a closed path adjacent said enwrapments and said molding units with individual ones of said receptacles being aligned with individual ones of said enwrapments and said molding units, mechanism for successively depositing predetermined quantities of said material into said enwrapments as they are received in said receptacles, means for accelerating said receptacles and enwrapments with respect to said molding units as deposition is completed, and means for wiping trailing portions of said enwrapments across portions of said molding units to remove residual plastic material therefrom.

5. Apparatus for packaging individual units of a moldable material which comprises a series of molding units continuously movable in a closed path, a source of supply of said material adjacent a portion of said path, feed mechanism for placing a predetermined quantity of said material in each of said molding units as they move past said source of supply, mechanism for successively advancing a series of enwrapments into alignment with said molding units, mechanism for successively depositing the material in each of said molding units in said enwrapments, and means for wiping with portions of said enwrapments moldable material tending to cling to said molding units to complete deposition of said material in said enwrapments.

6. Apparatus for producing packaged units of a moldable material which comprises a rotary member having a plurality of peripheral recesses, each of said recesses being provided with a radially movable piston member, a source of supply of said moldable material mounted adjacent the periphery of said rotary member, means for withdrawing said piston members to receive a quantity of said moldable material in said recesses as they move past said source of supply, means for feeding a series of connected enwrapments in a direction tangential to the periphery of said rotary member with each of said enwrapments being aligned with one of said recesses, means for moving said piston members radially outwardly to evacuate moldable material from said recesses into each of said enwrapments, and means for wiping with portions of said enwrapments moldable material tending to cling to said pistons.

7. Apparatus for producing packaged units of a commodity which comprises a rotary member having a plurality of peripheral recesses, each of said recesses being provided with a radially movable piston member, a source of supply of said commodity mounted adjacent the periphery of said rotary member, a series of receptacles movable into alignment with said recesses adjacent the periphery of said drum, feed mechanism for advancing a series of wrappers between said receptacles and said recesses with each of said enwrapments being aligned with one of said recesses and one of said receptacles, means for moving said pistons radially outwardly to transfer said commodity from said recesses into said enwrapments as said enwrapments are received in said receptacles, and means for successively accelerating said enwrapments and receptacles with respect to said pistons to cause portions of said enwrapments to wipe residual plastic material from the faces of said pistons.

8. The method of producing molded and packaged units of plastic material which comprises continuously and successively passing a plurality of molding units past a source of supply of plastic material under pressure, continuously and successively placing plastic material from said source of supply into said molding units, continuously and successively advancing a plurality of flexible enwrapments into register with said filled molding units, ejecting a unit of plastic material into each of said flexible enwrapments, wiping with portions of each of said enwrapments to remove residual plastic material of said unit of plastic material, and completing a package about each of said units of plastic material.

9. In the method of packaging plastic material the steps which comprise advancing a series of molding units containing plastic material, feeding a sequence of wrappers in synchronization with said molding units and adjacent the path of said molding units, depositing plastic material from said molding units into said wrappers and maintaining the paths of said molding units and wrappers adjacent while accelerating said wrappers with respect to said molding units to wipe portions of said units with said wrappers and remove plastic material tending to adhere thereto.

10. Apparatus for producing and packaging units of plastic material which comprises a source of supply of plastic material, a plurality of molding units, means for continuously and successively passing said molding units adjacent said source of supply, advancing mechanism for successively feeding a plurality of flexible enwrapments into register with said filled molding units, means for depositing units of plastic material from said molding units into said enwrapments, mechanism for causing portions of each of said enwrapments to wipe and remove residual plastic material ejected from said molding units, and wrapping mechanism to complete the enclosure of said units by said enwrapments.

11. Apparatus for producing packaged commodity units which comprises a plurality of commodity supporting elements mounted for movement in a closed endless path, a plurality of receptacles mounted for movement in a closed endless path adjacent a portion of the path of said elements, feed mechanism for advancing a series of expansible enwrapments between and in timed relation with said elements and said receptacles, and means for depositing commodity units from said elements into said enwrapments to expand the enwrapments as they are received in said receptacles.

12. Apparatus for producing packaged commodity units which comprises a plurality of commodity supporting elements mounted for movement in a closed endless path, a plurality of receptacles mounted for movement in a closed endless path with a portion of the path of said receptacle being adjacent a portion of the path of said elements, feed mechanism for advancing a connected sequence of flattened expansible wrappers in timed relation with and between said elements and said receptacles, and depositing mechanism to deposit commodity units from said elements into said wrappers as said wrappers and receptacles become aligned with said elements to cause said commodity units to expand said enwrapments as said enwrapments and units are received by said receptacles.

13. The method of producing packages of plastic material which comprises continuously advancing a series of molding units, depositing plastic material in said molding units while they are advancing, advancing a series of expansible enwrapments, each having at least one fold therein establishing an edge of the finished package, adjacent a portion of the path of said molding units, successively registering at least one folded edge of the enwrapments with the molding units, depositing plastic material from said molding units into said advanced enwrapments and expanding said enwrapments thereby, and completing the folding of the enwrapments about said deposited material.

CLARENCE W. VOGT.

References Cited in the file of this patent

UNITED STATES PATENTS

| Number | Name | Date |
|---|---|---|
| 1,486,748 | Higers | Mar. 11, 1924 |
| 1,545,513 | Peters et al. | July 14, 1925 |
| 2,010,523 | McClatchie | Aug. 6, 1935 |
| 2,010,524 | McClatchie | Aug. 6, 1935 |
| 2,019,002 | Drohmann et al. | Oct. 29, 1935 |
| 2,097,887 | Lacey | Nov. 2, 1937 |
| 2,444,155 | De Back | June 29, 1948 |